3 Sheets—Sheet 1.

C. W. BALDWIN,

Assignor to THE HYDRAULIC ELEVATOR CO.

HYDRAULIC ELEVATOR.

No. 10,224. Reissued Oct. 31, 1882.

Attest:
William Pardon
A. Hoomann

Inventor:
C. W. Baldwin
By his attorney
Charles E. Foote

THE NORRIS PETERS CO., PHOTO-LITHO., WASHINGTON, D. C.

C. W. BALDWIN,

Assignor to THE HYDRAULIC ELEVATOR CO.

HYDRAULIC ELEVATOR.

No. 10,224. Reissued Oct. 31, 1882.

Attest:
Courtney A. Cooper
William Paxton

Inventor:
C. W. Baldwin
By his attorney
Charles E. Wilkes

THE NORRIS PETERS CO., PHOTO-LITHO., WASHINGTON, D. C.

C. W. BALDWIN,

Assignor to THE HYDRAULIC ELEVATOR CO.

HYDRAULIC ELEVATOR.

No. 10,224. Reissued Oct. 31, 1882.

Inventor:
C. W. Baldwin
By his attorney
Charles E. Foster

Attest:
Courtney A. Cofrel
A. H. Lonmann.

THE NORRIS PETERS CO., PHOTO-LITHO., WASHINGTON, D. C.

UNITED STATES PATENT OFFICE.

CYRUS W. BALDWIN, OF CHICAGO, ILLINOIS, ASSIGNOR TO THE HYDRAULIC ELEVATOR COMPANY, OF SAME PLACE.

HYDRAULIC ELEVATOR.

SPECIFICATION forming part of Reissued Letters Patent No. 10,224, dated October 31, 1882.

Original No. 162,262, dated April 20, 1875; Reissue No. 7,019, dated March 28, 1876. Application for reissue filed April 4, 1881.

162262

*To all whom it may concern:*

Be it known that I, CYRUS W. BALDWIN, of Chicago, in the county of Cook and State of Illinois, have invented certain new and useful Improvements in Hydraulic Elevators, of which the following is a specification.

My invention relates to that class of hydraulic elevators in which the mechanism for lifting the suspended elevator-carriage consists of a piston working within an upright cylinder, and forced to descend by the action of a column of water under atmospheric pressure.

It is my object to utilize to as great an extent as possible the power employed, and to avoid waste of water by graduating the quantity discharged to the weight actually carried, and also by effecting the descent of the car or cage without any discharge of water. In this way, while the whole power of the elevator is available at any time, yet I use only so much of that power as is requisite to move the load.

The nature of my invention and the manner in which the same is or may be carried into effect can best be explained and understood by reference to the accompanying drawings, in which—

Figure 1:
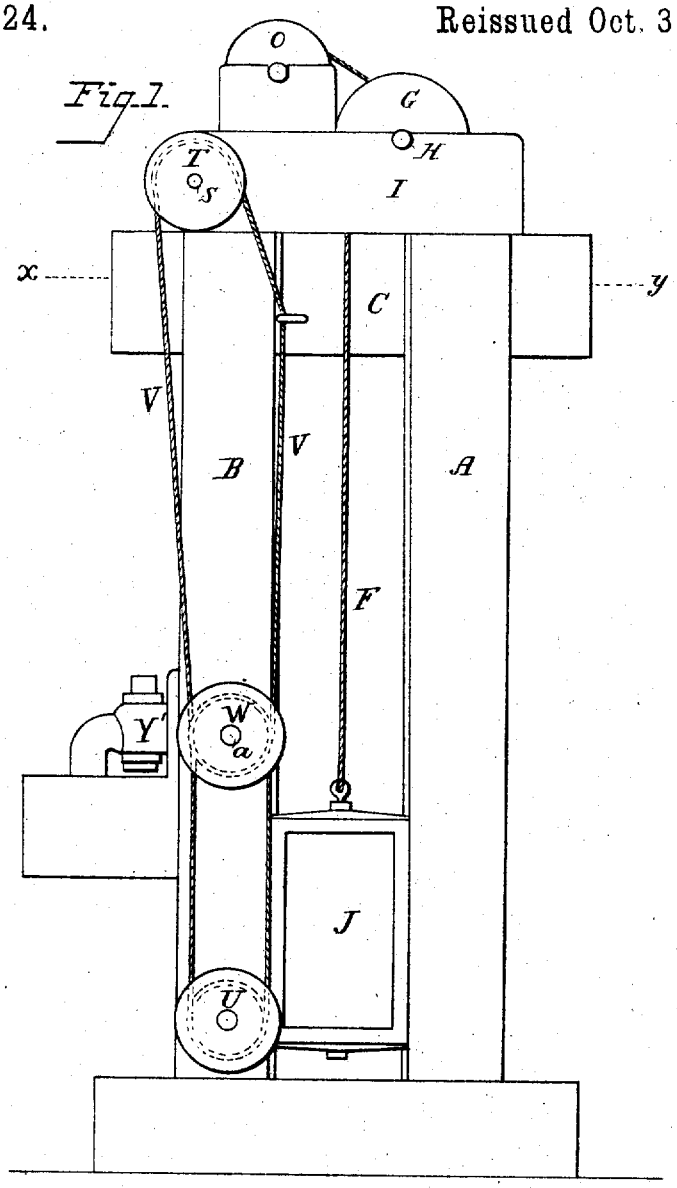
Figure 3:
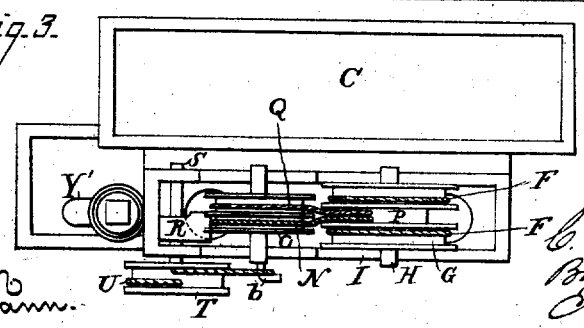
Figure 2:
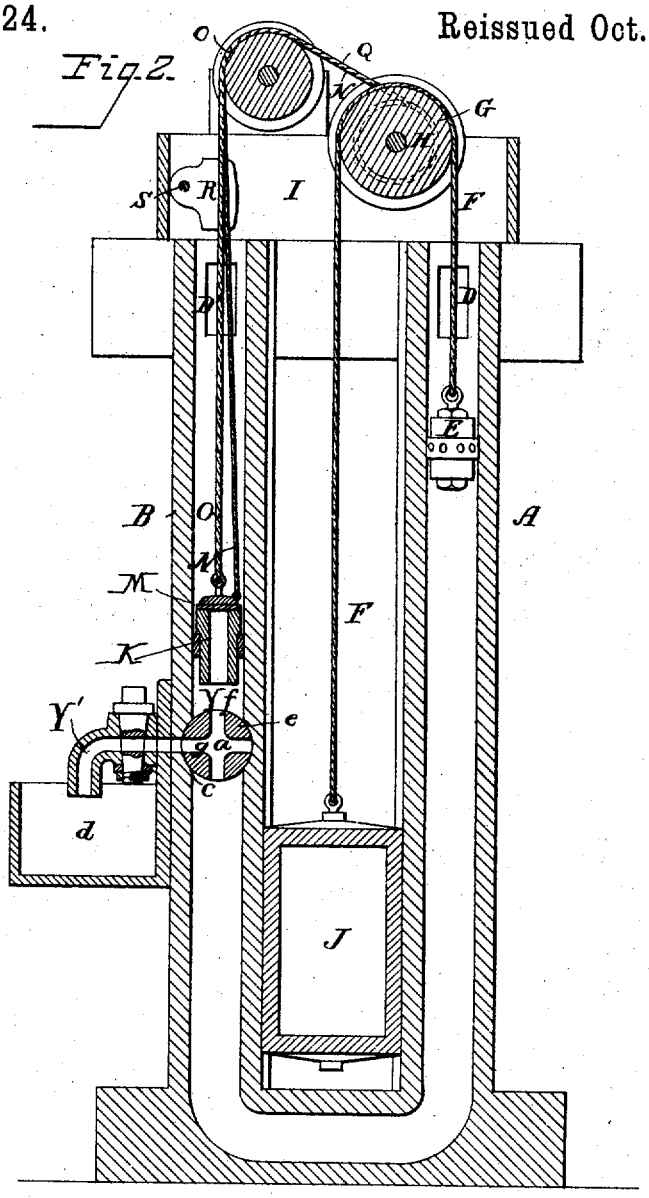
Figure 4:
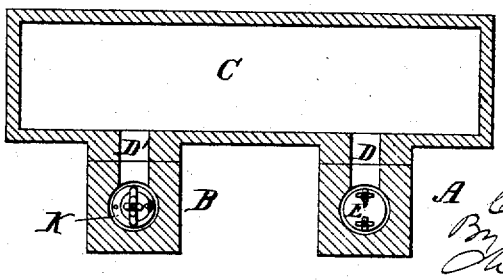
Figure 5:
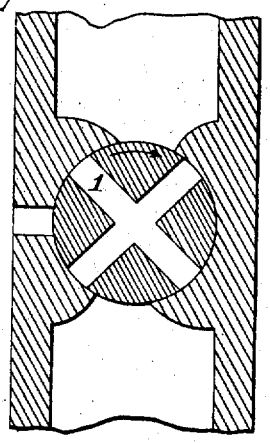
Figure 6:
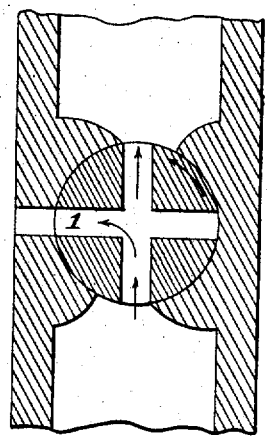
Figure 7:
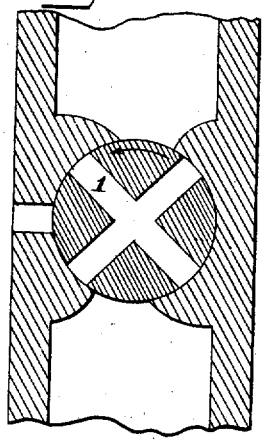
Figure 8:
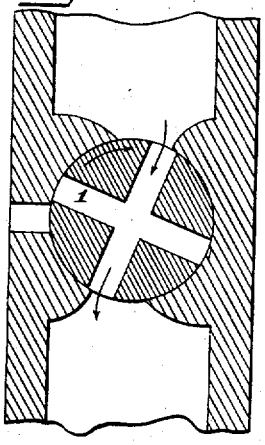
Figure 9:
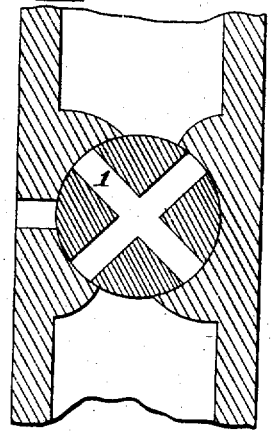

Figure 1 is a side elevation of an apparatus embodying my improvement. Fig. 2 is a vertical central section. Fig. 3 is a top view. Fig. 4 is a horizontal section on the line *x y*, Fig. 1. Figs. 5 to 9 are diagrams illustrating the operation of certain valve appliances.

A B are two water-tight tubes, of any required height, and made of any proper material. The tube A contains a lifting or working piston, E, and constitutes the lifting-cylinder, and this cylinder communicates at the top with a supply tank or reservoir, C, containing water under atmospheric pressure, and at the bottom the said cylinder communicates with the tube B, also in communication with the reservoir, so that there are two counterbalancing water columns contained in said tubes, the column in the lifting cylinder being counterbalanced by the outside column in the tube B, and the water can circulate freely from one column to the other under pressure from the reservoir when both tubes are unobstructed.

For the purpose hereinafter described, I place in the tube B a valved piston, K, which I term the "graduating" piston, of which the upper part of said tube, in which said piston works, constitutes the cylinder termed by me the "graduating" cylinder. The elevator-carriage J in this instance moves up and down between the tubes as guides. This carriage is connected with the lifting-piston by cords, wire ropes, or chains F, constituting flexible suspensories passing over drums or pulleys G, fixed on an axis, H, as plainly shown in Figs. 2 and 3. The weight of the lifting-piston should about counterbalance that of the carriage, but so that the latter will descend when there is no load upon the piston. The water from below the piston E is discharged at a port, Y′, about thirty feet below the highest point reached by the said piston when the carriage is down.

The escape-port is located in the tube B at a point nearer the lower than the upper end of the tube A, and if said port is opened when the carriage and lifting-piston are in the position seen in Fig. 2, the circulating-tube above the escape being closed or partially closed by the piston K, water will immediately flow from the tube B below the piston, thus destroying the equilibrium of the two columns and causing the lifting-piston to descend. This movement of the piston is due not only to the weight of the column of water which is between it and the reservoir, but also to the downward pull exerted on it by the water from below, for, in effect, at the moment the discharge begins there is, as it were, and resulting from air-pressure, a column of water thirty feet in height—*i. e.*, the difference between the elevations of the escape Y′ and lifting-piston, respectively, which column hangs to the under side of the piston, and which, with the water above the piston, constitutes the load or working-power of the latter. As this column should be as long as practicable, the point of discharge should be as far as possible from the limit of the upward movement of the piston E. The length of the column below the piston of course constantly decreases as the piston descends; but the resulting loss is compensated by the lengthening of the column above the piston, so that the working-load or pressure upon the piston is practically constant. The abovespecified distance of thirty feet I find to be most available for my purposes. It may, however, be more or less than that.

To control the flow of water from the escape-port Y′ and secure and control the circulation before described, I make use of a four-way cock, Y, which I have shown as one convenient means of furthering the objects I have in view. Various other valve devices may of course be used for the same purpose. The valve device used for this purpose, whatever it may be, I term the "escape-cock." It is required that at times it shall close the cylinder B and the escape Y′ as well to arrest the movement of the cage, at other times close the escape and open the tube B to permit the water to circulate, and at other times open both the escape and the cylinder to discharge the water from below the piston E. The diagrams 5, 6, 7, 8, 9 show on an enlarged scale how this is effected. As shown, the valve is located in the line of communication between the reservoir and lower end of the cylinder, and the latter extends below the plane in which the valve is situated—that is, it is longer than thirty feet, so as to permit the piston to move directly a greater distance than the height of the column of water supported by the atmosphere. As the water will remain in the cylinder A as high as the discharge-port, (that in the cylinder A being counterbalanced by that in the portion of the tube B extending upward from the lower end of the cylinder to the discharge-port,) and as the rise of the piston is thirty feet above the water-level, the water can be elevated to thirty feet above the level of the discharge, and no vacuum can result below the piston from the elevation of the piston to its highest point; but the piston can travel to the extreme lower end of the cylinder, moving below the level of the discharge-port, with the weight of water above it, and thus secure a direct lift of over thirty feet. When the piston is to rise the water-discharge port is closed, and all obstructions to the flow of water in the tube B are removed by adjusting the valve devices to open a passage through said tube when the piston will be drawn up in its cylinder by the weight of the cage, and the water, while under atmospheric pressure, will circulate freely from above the piston through the outside column to the space below the piston, exerting only such retarding influence as to insure a steady, even movement of the cage. By opening or closing the valve to a greater or less extent the rapidity of the circulation and the speed of the carriage may be regulated with the greatest nicety, but without the loss of any water or waste of power.

I have heretofore referred to the raising of the carriage by the discharge of the whole body of water from beneath the piston, as is necessary when the load in the carriage is heavy; but it is obvious that if the same volume of water is discharged (and the same quantity must be taken from the cylinder at each stroke) when the car is but slightly loaded there must result waste of power. I therefore propose to return a portion of the water thus necessarily discharged from the lifting-cylinder back to the reservoir, which result I effect by means of the graduating valved piston K, as I will now describe. The said piston is hollow or tubular, and a flap or hinged valve, M, is at its upper end. The piston is flexibly suspended by a rope or cord, Q, passing over a pulley, O, and made fast to a drum, P, fixed on the axis H of the pulleys G, which are revolved by the movement of the cords of the lifting-piston.

The valve M has connected thereto a cord, N, for opening it, and this cord runs over a pulley, O′, and is fast to the drum P. The valve-piston in this instance travels up and down in its cylinder about three-fourths only of the distance traveled by the lifting-piston. The drum P therefore is proportionately smaller than the pulley G, with a corresponding increased leverage, whereby the loaded piston E can raise the weight both of the cage and its load and of the water above the piston K.

The escape-cock Y has a stem, *a*, extending out through the cylinder B, and carrying a pulley or wheel, W, to which is made fast the valve-cord V. This valve-cord extends from the top to the bottom of the apparatus, passing over pulleys T U, as shown, so as to be accessible from the cage, whatever may be the position of the latter. It is fast to the upper pulley, T, and to the axis S of this pulley is fixed an arm, R, which has its outer end against or so as to engage the cord N of the valve M. A movement of this arm in either direction will operate or bend the cord in such manner as to lift the valve M. There is sufficient play between the arm and its cord to allow the valve-cord V to be pulled sufficiently to operate the escape-cock independently of the valve M. When the carriage J is down, as seen in Fig. 2, and at rest, the escape-cock Y is in the position shown in Fig. 5. Suppose the elevator to be loaded to its full carrying capacity. To lift this load the escape-cock is revolved to the right to assume the position shown in Fig. 6, and the valve-cord is pulled far enough to open wide the valve M, which will enable the water in the cylinder to pass from above the piston K to below the piston as the latter rises. All the water below the lifting-piston will under these conditions pass out through the escape Y′, and the elevator will work at its full power. But suppose the load to be lifted is but one-half or but one-quarter that which can be lifted. In this case the escape-cock is opened, as before, but the valve-cord is pulled far enough to open valve M only slightly, just sufficient to take a part of the load from the piston K and start the carriage. In this case as the valve-piston rises it will move faster than the water can pass through the same, and will carry some of the water above it back to the reservoir, and will also tend to lift into the lower part of the cylinder above the cock Y a portion of the water that would otherwise escape. This water is kept in the cylinder when the car stops in its upward ascent, inasmuch as the four-way cock to arrest the car is turned from the position in Fig. 6 to that in Fig. 7. Now, when the car is to descend the valve-cord is pulled to turn the escape-cock to the position shown in Fig. 8, when the escape is closed and the valve M lifted, and the vertical passage through the tube B is open. The carriage will then descend, its weight lifting the piston E, and the water circulates freely from the top to the bottom of the working piston, and the piston K, following the down movement of the carriage, will descend to its original position in the cylinder above escape-cock Y. The down movement of the carriage is arrested on stopping the circulation by bringing the escape-cock to the position shown in Fig. 9. The next upward movement of the valve-piston will have the effect of lifting another portion of the body of water above it into the reservoir C. So far as this graduating action is concerned, it is not necessary that the escape should be located with respect to the lifting-piston, as hereinbefore explained, for the cylinders may be separated, and the escape from the main cylinder may lead into a tank at the bottom of the apparatus, and from this tank a suction-pipe may lead to the graduating-cylinder; but to give effect to both the objects I have in view I prefer to combine the two elements in the manner substantially as described. It is important, however, that the escape be at a point nearer the lower than the upper end of the cylinder A, as by decreasing the distance between this port and the point to which the piston E is elevated the power of the apparatus is proportionately reduced.

By the means described I am enabled to graduate the quantity of water expended in elevating the load to the weight of the latter, to avoid loss of water when the cage descends, and also to regulate the speed of the cage. The cylinders of course are supposed to be filled at all times with water under atmospheric pressure from the supply-reservoir.

An important feature of the invention above set forth is the manner of regulating the flow of the motor-fluid. By a single valve mechanism the water may be discharged from beneath the piston, near the end of the cylinder, to elevate the carriage, or may be caused to circulate from one side of the piston to the other to lower the carriage, or may have its circulation or discharge arrested to stop the carriage, and each of these changes may be effected by a single movement of one valve-operating device. The attendant is not confused and liable to make mistakes from his attention being directed to a number of details, while the speed of the cage is regulated simply by varying the extent and not the character of the movements.

I claim—

1. The combination, in an elevator, of a lifting piston and cylinder, and pipes and valve appliances arranged to discharge the water from one end of the cylinder as the water under atmospheric pressure flows into the other end to lift the cage, and also to circulate the water without discharging as the cage descends, substantially as set forth.

2. The combination, with the two communicating upright cylinders, of the lifting-piston in the one cylinder and the water-escape in the other cylinder, located with respect to the lifting-piston, substantially as shown and described.

3. The combination, in a hydraulic elevator, of a lifting-cylinder communicating with a reservoir of water under atmospheric pressure, a cage connected to the piston, a valve device constructed to discharge the water from one side of the piston, and also to permit the water to circulate, and appliances whereby said valve may be operated from the cage while the latter is in any position, substantially as set forth.

4. The combination, with the cylinder of a hydraulic elevator, of a valve device and operating appliances constructed to open the discharge, and to close the discharge and permit the water to circulate from one side to the other of the piston, and to arrest both the discharge and circulation each by a single movement of the valve device, substantially as set forth.

5. A hydraulic elevator provided with a cylinder exceeding thirty feet in length, and with a water-escape at a point thirty feet below the upward limit of the piston's motion, and connecting with the lower end of said cylinder, substantially as set forth.

6. In a hydraulic elevator, the combination of the working cylinder and piston, and a supplementary valved piston connected to the cage and arranged in a tube communicating with the lower end of the said cylinder, and appliances whereby to operate the valve of said piston, substantially as set forth.

7. The combination, in a hydraulic elevator, of a motor-cylinder containing a piston, an inlet to supply water, an outlet or discharge passage below the piston, and a valve device whereby the column of water above and below the piston is caused to load and move the latter with a uniform power.

8. The combination, in a hydraulic elevator, of a motor-cylinder containing a piston attached to the cage, an inlet-passage to supply water under pressure above the piston, an outlet or discharge passage below the piston, and a valve device whereby the power of the column of water above the piston and of the column of water below the piston may be jointly and simultaneously exerted to load or carry down the piston with a uniform power.

In testimony whereof I have signed my name to this specification in the presence of two subscribing witnesses.

CYRUS W. BALDWIN.

Witnesses:

CHARLES E. FOSTER,
WILLIAM PAXTON.